United States Patent [11] 3,616,070

[72] Inventor Jerome H. Lemelson
 85 Rector St., Metuchen, N.J. 08840
[21] Appl. No. 739,825
[22] Filed June 25, 1968
[45] Patented Oct. 26, 1971
 Continuation-in-part of application Ser. No.
 703,287, Feb. 6, 1968, now abandoned.

[54] LAYUP APPARATUS
 11 Claims, 17 Drawing Figs.
[52] U.S. Cl.................................................. 156/446,
 156/167, 156/173, 156/500, 242/7.21
[51] Int. Cl........................................................ B65h 54/00
[50] Field of Search............................................ 242/7.21,
 7.22; 156/446, 500, 173, 433, 116; 18/12 N, 12 F,
 8 WB

[56] References Cited
 UNITED STATES PATENTS

| | | | |
|---|---|---|---|
| 3,052,266 | 9/1962 | Huck............................ | 242/7.21 X |
| 3,112,895 | 12/1963 | Kinney......................... | 156/446 X |
| 3,206,899 | 9/1965 | Wright.......................... | 156/500 X |
| 3,255,976 | 6/1966 | Mede ............................ | 242/7.21 |
| 3,367,815 | 2/1968 | Ragettli et al................. | 156/446 |
| 3,391,873 | 7/1968 | Hardesty....................... | 156/446 |
| 3,440,125 | 4/1969 | Lindh et al.................... | 156/500 X |
| 3,448,253 | 6/1969 | Bramblett et al. ............ | 156/173 X |
| 2,729,268 | 1/1956 | Broughton et al. ........... | 156/425 X |
| 3,391,873 | 7/1968 | Hardesty...................... | 242/2 |
| 3,443,276 | 5/1969 | Smith et al.................... | 18/12 F |
| 3,477,652 | 11/1969 | Crowley....................... | 242/7.21 |

Primary Examiner—Benjamin A. Borchelt
Assistant Examiner—G. E. Montone

ABSTRACT: A method and apparatus are provided for forming large wall or shell-like structures such as tanks, vessels, containers and buildings on the site where they are to be used. In a first form, a filament-winding technique involves the use of a preform erected at the location of the shape to be formed, the preform and/or the filament-winding equipment being rotatable so as to dispose a plurality of filaments on the receiving surface in a circular arrangement to define strata of the wall being formed. The preform may comprise a thin sheetlike member erected at the site of use. The sheetlike wall may be self-supporting, supported by a skeletal frame or inflated and supported by air pressure.

The filament-winding apparatus may include a base for supporting the preform and the eventual housing to be formed thereof, said base being stationary such as a tarmac formed on the ground or rotatable on a tarmac to rotate the preform while the apparatus for directing material such as fluent material and/or filaments against the surface of the preform moves in a vertical direction to properly dispense same and buildup a suitable wall formation thereof. In another form, the dispensing apparatus is also operative to rotate about the preform on a track or on an overhead conveyor such as a boom or overhead track erected at the site of location of the vessel or shell.

INVENTOR.
JEROME H. LEMELSON

INVENTOR.
JEROME H. LEMELSON

INVENTOR.
JEROME H. LEMELSON

LAYUP APPARATUS

RELATED APPLICATIONS

This is a continuation-in-part of copending application, Ser. No. 703,287 filed Feb. 6, 1968, now abandoned, and entitled Deposition Molding Apparatus and Method and having as a parent application, Ser. No. 734,340 filed May 9, 1958, now U.S. Pat. No. 3,173,175, for Molding Apparatus, and Ser. No. 501,396, filed Oct. 22, 1965 3,412,431 for Manipulator Joint and Apparatus having as a parent application Ser. No. 251,410 for Article Manipulation Apparatus filed Jan. 14, 1963 now U.S. Pat. No. 3,272,347.

SUMMARY OF THE INVENTION

This invention relates to apparatus and methods for forming large hollow structures such as tanks, vessels and shell-like housings preferably at the site of their use by employing either a combination of filament or ribbon winding and deposition technique or by otherwise depositing fluent material on a preform.

It is known in the art to form bodies of revolution by winding a plurality of threads or filaments of glass fed from spools, back and forth against a preform which is rotated about a fixed axis and bonding the filaments together with a plastic applied to the filaments as they are fed to or drawn against the preform. Filament winding machinery has heretofore comprised a rotatable head stock and tail stock between which is suspended a preform, generally a body of revolution, which is rotated about its axis of symmetry disposed at the axis of rotation of the head and tail stocks. When the winding is completed, the wound and molded shell is either removed from the preform or retained thereon for use of the composite shell as a casing after it is removed from the machine. The winding machine is located in a manufacturing plant As a result, shapes and bodies producible by the apparatus of the prior art have been limited in overall dimension and configuration not only because of the limitations inherent in the factory operating winding machines but also because of the limitations resulting from the necessity of handling and transporting the shapes so formed to the site or location of their use. Large, hollow containers such as oil, chemical and water tanks have heretofore been fabricated of many sections of rolled metal plate or sheet which are welded or riveted together at substantial expense due to labor and material costs.

Accordingly, it is a primary object of this invention to provide a new and improved apparatus and method for fabricating large hollow bodies of revolution such as tanks, vessels and the like.

Another object is to provide an apparatus for fabricating large tanks, vessels and the like at the site of their use by filament winding so as to eliminate the need to transport same to such location.

Another object is to provide an apparatus and method for fabricating large vessels such as oil and gasoline tanks directly from a plurality of raw materials without the need for erecting and joining separately formed wall portions of the vessels.

Another object is to provide a new and improved apparatus and method for forming hollow objects by winding filaments or other shapes which are freshly formed at or near the winding machinery thereby eliminating the need to provide spools of filamentary material and to replace and adjust same when they run out.

Another object is to provide an apparatus and method for forming the walls of structures such as vessels, housings, buildings and the like by extrusion forming portions of said walls in situ against supporting means.

Another object is to provide an improved extrusion apparatus capable of forming composite structures.

With the above and such other objects in view as may hereafter more fully appear, the novel constructions, combinations and arrangements of parts as will be more fully described and illustrated in the accompanying drawings, but it is to be understood that changes, variations and modifications may be resorted to which fall within the scope of the invention as claimed.

FIG. 2' is an isometric view of a fragment of a modified form of the apparatus of FIG. 2;

Figure 1:
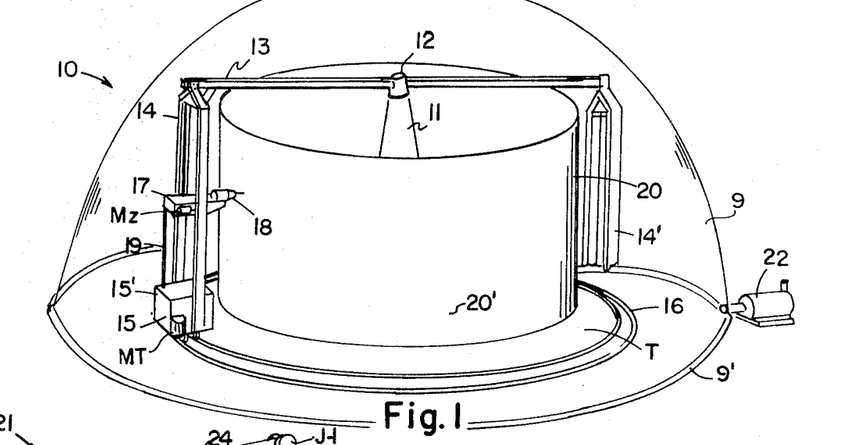
FIG. 1 is an isometric of an apparatus utilized to form a large, hollow object such as a cylindrical vessel by automatic winding or layup techniques.
Figure 15:
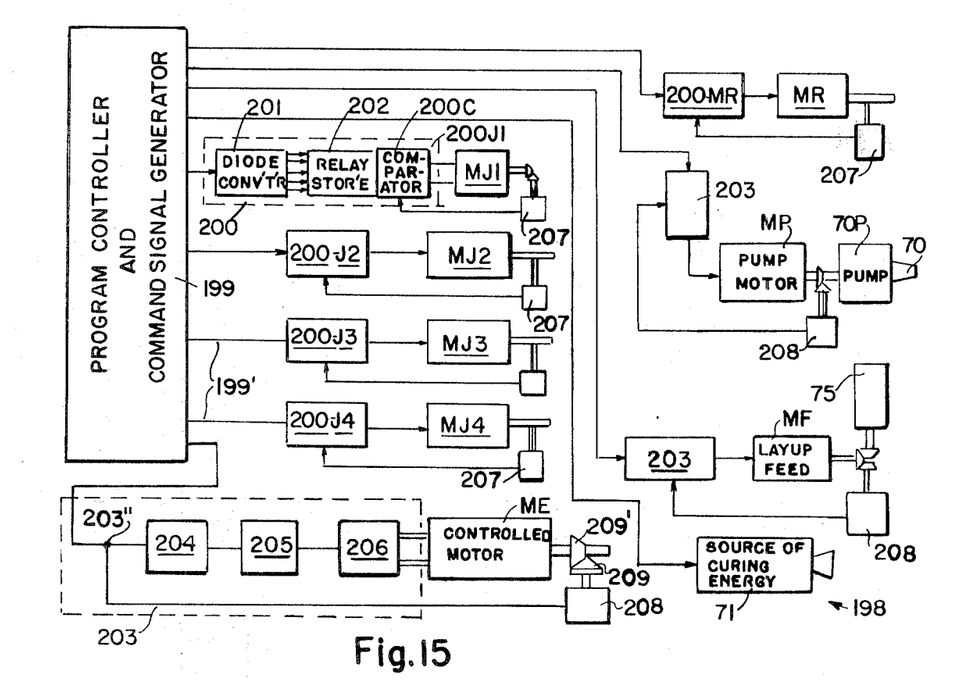
Figure 16:
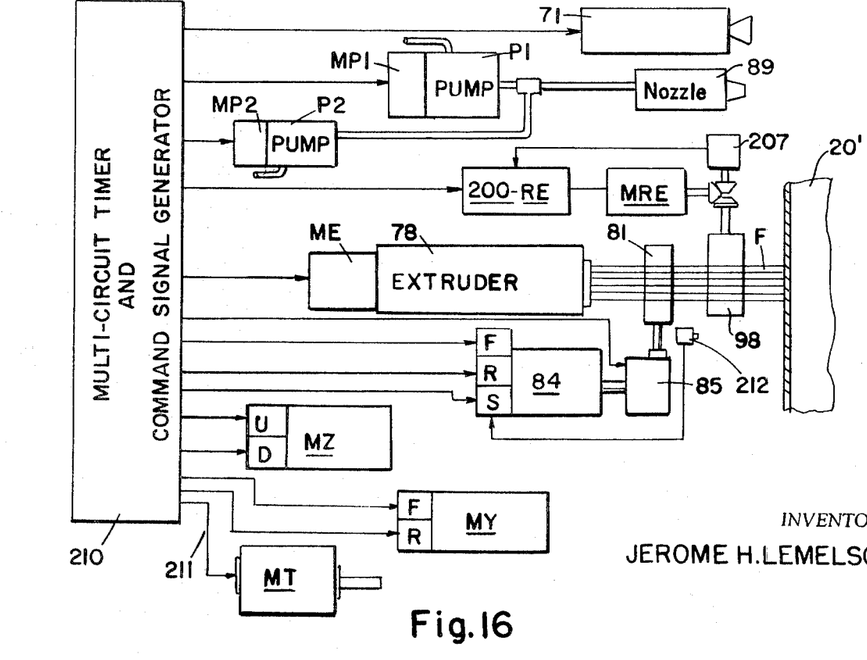

FIG. 15 is a schematic diagram of an automatic control system for a filament winding or layup apparatus of the type shown in FIG. 2 and FIG. 16 is a schematic diagram of a layup or winding apparatus employing an extruder for supplying material to be deposited or wound. There is shown in FIG. 1 an apparatus 10 for forming large cylindrical containers 20 such as water tanks, oil and chemical tanks and the like at the site of their erection and use. In a first form of the invention, a centrally disposed vertical pylon or tower 11 is erected either on the ground or a concrete, plastic or otherwise formed foundation or tarmac T and has a rotatable fitting or fixture 12 at its upper end to which a radially outwardly extending boom or arm 13 is secured. Secured to the outer end of arm 13 and subtending downwardly therefrom is a vertical arm or frame 14 supported at its lower end on a carriage 15 which is adapted to travel a circular track 16 extending around and outwardly of the volume defined by the cylindrical wall or tank 20 to be erected or wound. Movable up and down and guided in frame 14 is a carriage assembly 17 which is provided with means for supplying and, in certain instances, forming and disposing material such as a plurality of windable filaments against a preform 20' of cylindrical shape. The preform 20' defines a base or support for said filaments during the layup or winding operation and will be described hereafter. In FIG. 1, the notation 18 refers to the head part of assembly 17 from which deposition material or filaments are guided or flowed onto the surface of preform 20'.

The head 18 may also comprise or contain a flame spraying unit for temperature processing and spraying material such as metal, plastics or ceramics therefrom on to the surface of the preform.

The assembly including arms 13 and 14, carriages 15 and 17 may be power driven to rotate about the axis defined by pylon 11 by either power rotating the pylon 11 with the arm 13 attached thereto or by power driving carriage 15 along track 16 or by a combination of power rotating pylon 11 synchronized to the powered operation of carriage 15 along track 16.

The carriage 17 is operative to be power driven up and down vertical frame 14 while material is dispensed or guided therefrom to be wound on the preform 20', or sprayed thereon or extruded as a sheet or strip thereon as will be described hereafter.

The preform 20' may comprise a shell of light sheet material which is self-supporting, supported on a frame or maintained erect by air pressure. The cylindrical preform 20' may thus be made of one or more cylindrical sections of sheet metal, or rigid plastic or laminates of rigid materials or may be formed of flexible, plastic sheet or film formed in an inflatable enclosure and erected on the tarmac T by inflation with air. Suitable supporting skeletal structures or wires (not shown) may be connected to pins or eyebolts sunk into the concrete or plastic of the tarmac T and connected to hold the preform 20' erect during the winding or layup procedure's initial stages.

The arm 13 may also extend radially to the other side of the preform as shown and may be connected to a second vertical arm or frame 14' for guiding a second winding or layup apparatus (not shown) similar to that supported by frame 14 and operative to wind or deposit material onto the preform simultaneously with the similar operation of the other winding or layup apparatus.

Other features of the apparatus of FIG. 1 includes the provision of a supply means or reservoir 15' of layup material on the lower carriage 15 and a flexible conduit or conveyor 19 extending between the lower carriage 15 and the vertically movable carriage 17 to supply the dispensing head 18 with layup and/or winding material. A motor MZ mounted on the carriage 17 power drives said carriage up and down the trackway and is automatically controlled in its operation to assure suitable deposition of material on the preform 20'. Notation 9 refers to an inflatable, domelike enclosure which may be maintained inflated about the apparatus and preform of FIG. 1 to protect same from elements of weather and flying dirt during the winding operation. A ballast ring 9' supports the inflated wall of the enclosure and a compressor 22 maintains air pressure.

Figures 2, 3, 4:
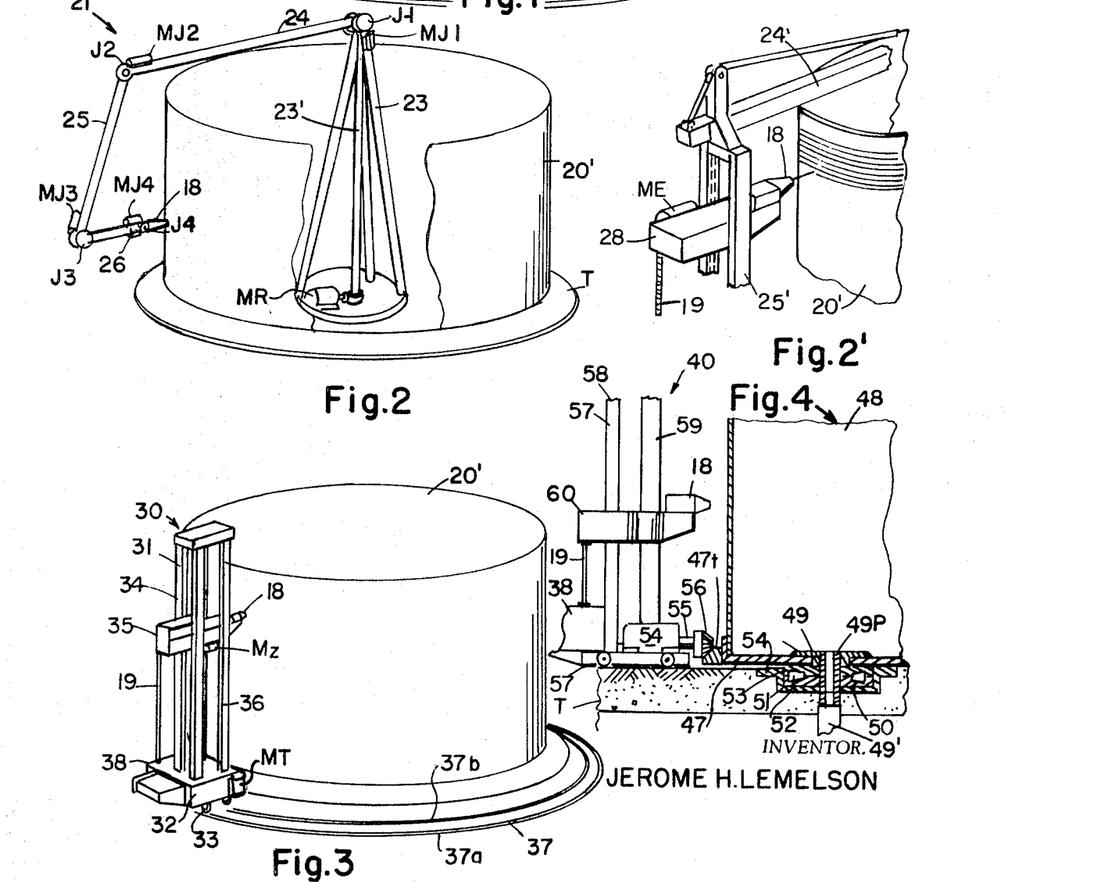
FIG. 2 is an isometric view with parts broken away for clarity of a modified form of the apparatus of FIG. 1.
FIG. 3 is an isometric view of a modified form of tank winding or layup apparatus in which the winding means is totally supported by a track located on the ground.
FIG. 4 is a side view with parts broken away for clarity of a form winding up layup apparatus wherein the form is rotated while the winding means remains stationary.

In FIG. 2 is shown a modified form of the apparatus of FIG. 1 for forming cylindrical housings as described by winding or otherwise laying a material onto a preform as the winding or laying means rotates about the preform. Unlike to apparatus 10 of FIG. 1, apparatus 21 is supported only from the interior of the tank preform 20' and does not ride on a circular track. The apparatus 21 includes a support or base 22 having a pylon or column 23 supporting drive shaft 23 which shaft is power rotated about a vertical axis on said base by a motor MR. A first lateral arm 24 is pivotally supported at the upper end of pylon 23 about a joint J-1 and is power rotatable about a horizontal axis to raise and lower a second arm 25 for vertically positioning a winding or dispensing head 18 disposed on a third arm 26 at the end of arm 25. The head 18 may be operative as elsewhere described herein to guide a plurality of preformed filaments or ribbons onto the preform, or to extrude one or more filaments, ribbon or sheet material to be wound or otherwise disposed against said preform. Notations J-2 and J-3 refer to joint mechanisms respectively joining arms 24, 25, and 25, 26 each of which joint mechanisms include a motor for power rotating one arm with respect to the other as provided, for example, in my copending application, Ser. No. 501,396. Each of the described motors is preferably controlled by a single master controller or other form of control means which may also control the means driving, feeding or controlling the flow of winding filaments and other material being deposited on the preform so that the winding or deposition operation may be predetermined and varied, if need be, in accordance with variations in external shape or diameter, wall thickness requirements, and deposition material. In operation of apparatus 21, while arm 23 is predeterminately rotated, the motors MJ1, MJ2, MJ3 and MJ4 are predeterminately controlled to properly guide head 18 both around and vertically with respect to preform 20 to wind or distribute the filaments or layup material on the preform. In the apparatus 21 of FIG. 2, layup or winding material may be provided on one or more reels or reservoirs (not shown) supported by arm 26 or may be fed from a source or reservoir supported on or adjacent to base 22 and fed through passageways in the arms 23-26 and across the joints J1 to J3 as shown in greater detail in my copending application, , Ser. No. 501,396.

In FIG. 2' is shown a modified form of the apparatus of FIG. 2 having the lower joint J3 and arm 26 eliminated with the arm 25' adapted to be supported in a vertical attitude as it is rotated about the tank preform. The discharge or guide head 18 is supported on a carriage 28 which is adapted to be power driven by a motor ME up and down arm 25' for vertically positioning the layup or winding material.

FIG. 3 illustrates another form of the invention wherein a winding or layup apparatus 30 for tanks and the like comprises a movable assembly 31 mounted on a base carriage 32 having wheels 33 adapted for travel on a circular track 37 composed of concentric circular rails 37a and 37b extending around and a distance away from the cylindrical preform. The carriage 32 is power driven on track 37 by a motor MT coupled to the wheels of the carriage which motor is speed controlled in accordance with the rate of efflux or drive of the material to be wound or deposited on the preform 20'.

Extending upwardly from and supported by the carriage 32 is a frame 34 supporting a vertical trackway 36 for guiding a second carriage 35 in vertical movement off the surface of the preform 20' whereby material to be deposited or wound may be guided or flowed from a head 18 mounted on and extending horizontally from said carriage 35 and is operative to drive said carriage up and down on track 36 at a predetermined rate as the apparatus 30 travels circularly about the preform 20' or track 37 so as to predeterminately wind filaments or deposit material thereon.

As in the operation of the other apparatus provided herein, winding or layup material may be fed to the dispensing head 18 mounted on carriage 35 from a supply thereof in the form of spools, a hopper or other means to be described, mounted on the carriage 35 or supported by the base carriage 32. A flexible conduit 19 is shown in FIG. 3 for carrying layup or winding material from a supply means or reservoir 38 supported by carriage 35 and is connected at its other end either directly to head 18 or to further means (not shown) on carriage 35 for predeterminately supplying said head with deposition or winding material.

In FIG. 4 is shown a modified form of apparatus 40 for forming a tank or vessel on a preform by rotationally mounting said preform on a foundation at the site of its use and rotating same during the winding or layup operation while the filament winding head or spray head is moved only in the vertical direction. The winding preform comprises a disc shaped base 47 having a hub 49 at the center thereof supporting a pin or shaft 49P which rotates in a thrust bearing 50 sunk in the concrete or plastic tarmac T. The bearing 50 comprises a lower bearing member 51 with tapered rollers 52 engaged by an upper hub member 53 having a flange 54 operative to engage and support the bottom face of disc 47. Depending on the size of disc 47 and the height of the tank to be formed, three or more wheels W may be mounted near the periphery of the disc 47 to ride on the tarmac T or on a circular track (not shown) disposed thereon to facilitate rotation of the tank preform during winding. Extending upwardly from the periphery of the disc 47 is a cylindrical frame or sidewall 48 formed, as described of rigid or inflatable sheet material. The sidewall is shown joined by a top wall 48T which, if the preform sidewall is made of rigid sheet material, serves to support the upper end of the preform and, if made of flexible material, serves to form an enclosure capable of being inflated to define the shape of the preform prior to winding or layup.

Controlled rotation of the preform may be effected in a number of manners. In FIG. 4, the peripheral circular edge of the base 47 is provided with gearlike teeth 47t therein which teeth are engaged by the teeth of a small bevel or spurgear 56 secured to a shaft 55 driven by a controlled gear motor 54 supported by a base 57 which also supports the winding and layup equipment. Extending upwardly from base 57 is a frame 58 supporting a vertical track 59 on which a carriage 60 is operative to travel as power driven therealong to position and move the dispensing or guide head 18 for winding or otherwise depositing material on the preform as the latter is predeterminately rotated as described.

Upon completing winding and/or material layup operation to form the cylindrical sidewall of the tank one or more additional operations may be effected to complete the fabrication of the installation. These may include any or all of the following operations: s a. Winding and/or layup of deposited material may be effected by suitable program or computer control of the described servo motors to form the top of tank or vessel integral with the side wall either as the side wall is formed or upon the completion thereof by disposing filamentary and/or deposition material on the top wall portion of the preform.

b. A separate top wall or cover may be secured to the upper rim of the wound or deposited cylindrical sidewall and may be used per se, bonded thereto or form a base onto which further material is wound or deposited to mold a unitary, integral tank structure.

c. Fittings for filling and emptying the tank of fluids may be secured to openings provided in the top, bottom and/or side walls of the tank or the tubular pin 49P of FIG. 4.

d. The bottom wall or disc 47 may be supported from beneath by employing planking or chocking means, by lowering same to the tarmac T after removal of the wheels W and bearing 50 or suitable material such as concrete or plastic may be injected or poured into the volume between wall 47 and the tarmac and allowed to harden. Tapping and filling of liquid contents of the tank may be attained through piping 49' in the tarmac T when it is formed (not shown) extending through the center of bearing 50 and hub 49 to the interior of the tank through the hollow pivot pin 49P.

Turning now to the construction of the filament winding or layup head defined by notation 18 in FIGS. 1 to 4, there are shown in FIGS. 5 to 9, a number of different devices mounted on the described vertically traveling carriers, for performing either or both the operations of guiding a plurality of filaments or otherwise shaped elongated filaments in a winding operation onto the tank preform and/or for forming, spraying or flowing fluent material and curing same thereon such as liquid or molten plastic, foamed or foaming plastic, concrete or cement depending on the nature of the wall or shell to be formed.

Figures 5, 6, 7, 8:
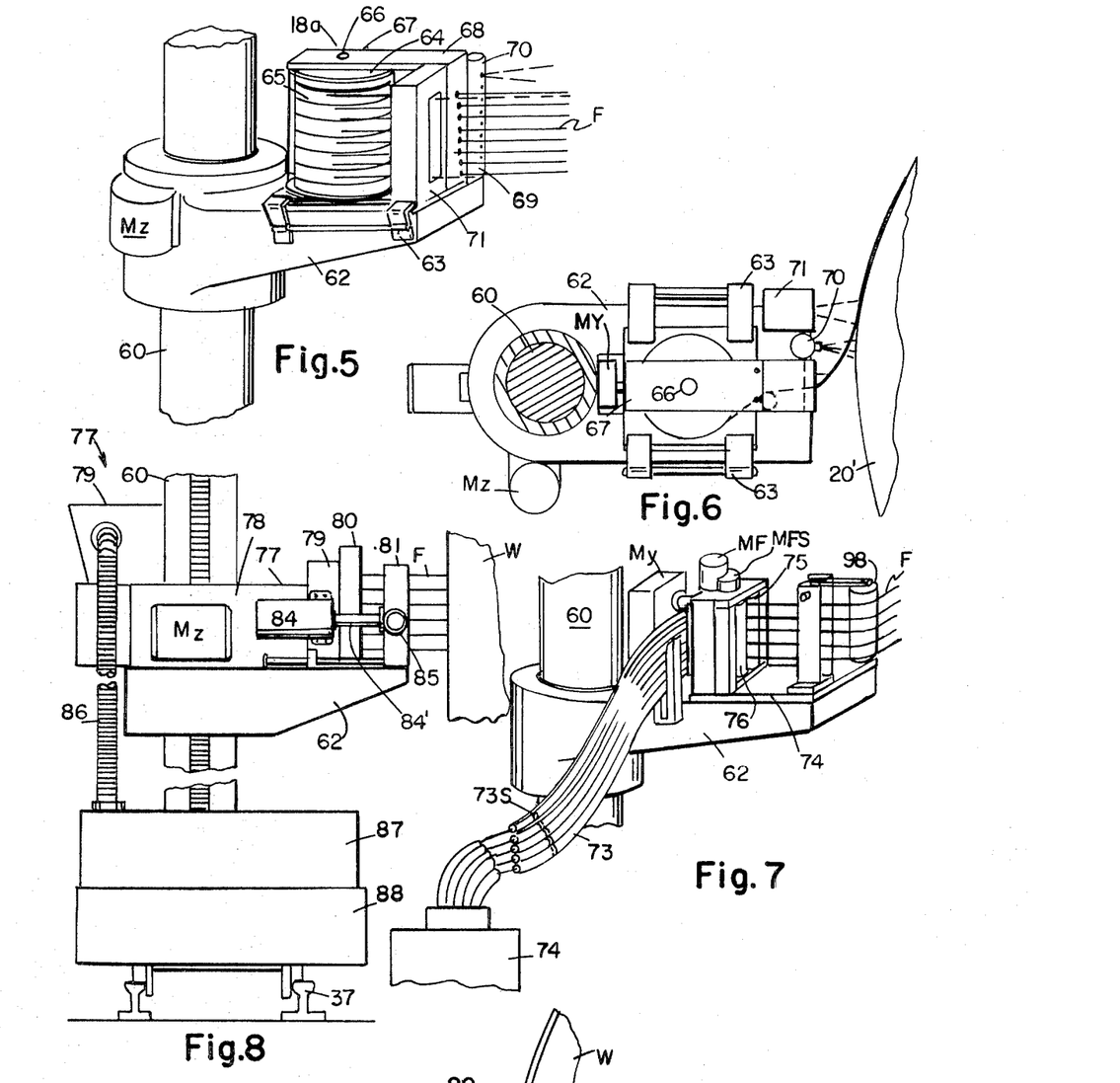
FIG. 5 is an isometric view of part of a filament winding head and manipulator applicable to the devices of FIGS. 1-4.
FIG. 6 is a plan view with parts broken away for clarity of a modified form of the apparatus of FIG. 5.
FIG. 7 is an isometric view with parts broken away for clarity of a modified form of filament-winding apparatus having filament supply means located remote from the winding head.
FIG. 8 is a side view of a portion of a filament-winding apparatus employing means for continuously and automatically forming filaments just prior to their winding.

FIGS. 5 and 6 show one form of filament winding head assembly 18a comprising a platform 62 extending outwardly from the carriage 61 which is adapted to travel up and down a vertical arm or trackway 60 positioned as hereinabove described, parallel to the surface of the housing or vessel preform. Removably secured by means of a clamping fixture 63 on the platform 62 is an assembly 64 of a plurality of spools 65 of filamentary winding material, the spools 65 being disposed one above the other for free wheeling rotation on a shaft 66 which is supported by a frame 67. One side 68 of the frame 67 is a hollow housing having holes in opposite walls thereof through which the filaments F may extend. Tensioning and/or drive means (not shown) are provided in the housing 68 for suitably feeding the filaments from the spools 65 to the surface of the preform during the winding operation as described.

Disposed at one side of the spool frame assembly 64 and supported by the platform 62 is a header 69 containing a plurality of spray nozzles 70 for flowing fluent material such as liquid or molten polymer and/or other suitable material adapted to serve as a binder for the filaments and/or as the matrix for the shell formed on the preform. Such polymer may comprise a resin such as a polyester, epoxy, polysulfone, polycarbonate or other resin which may also be applied directly to the filaments in the housing 68 by suitable means. If sprayed or extruded onto the surface of the article being wound-formed the polymer flow may be effected by a motor operating a pump or screw, said motor being automatically controlled in its operation as described.

Also shown in FIGS. 5 and 6 is an apparatus 71 supported on the platform which device is operative to cause the rapid solidification or curing of the polymer ejected from nozzles 70 afterit has been deposited and the filaments have been embedded or compressed thereagainst. The apparatus 71 may comprise one or more devices for generating and directing intense radiation against the composite deposited and wound materials such as an electron gun, microwave generator, glow discharge means or source of atomic radiation.

The apparatus 18a of FIGS. 5 and 6 may be operated to deposit both resin as a spray and to wind a plurality of filaments on a preform by any of the machine arrangements described and illustrated in the other drawings or may be employed to construct a shell, wall, vessel or housing by merely distributing fluent, hardenable or settable material or materials against a preform by spraying same from one or more nozzles such as nozzles 70. Premixes of short reinforcement filament and resin may also be sprayed or disposed from the head assembly 18a as the conveying means therefore is predeterminately controlled and positioned as described.

The individual glass, plastic of metal filaments F which are carried by the spools 68 may be secured to the preform or partly completed molding to effect the start of a winding cycle by auxiliary means, not shown, secured to or separate from the platform 62 which auxiliary means is operative to clampingly engage and compress the filaments against the form or base they are to be wound on while the ends of said filaments are either welded thereto with heat or radiation applied to the filaments and base or adhesively bonded in encapsulating resin applied by the automatically controlled operation of the described filament securing operation may be under the control of the same master controller controlling operation of the winding and layup action. A motor My is shown in FIG. 6 secured to platform 62 and having the output shaft operative to move the spool assembly 64 on to bring the ends of the filaments F into contact with the surface on which they are to be wound for bonding same to resin deposited thereon as described. In this arrangement, the spool mount is movable on the platform 62 or a supporting frame secured thereto.

In FIG. 7 is shown a modified form of the apparatus of FIGS. 5 and 6 wherein a plurality of filaments or threads as described are remotely supplied from respective spools or forming means provided in a container 74 for said filaments and are each fed through a separate duct 73' of a flexible conduit 73 extending to a fixture 74 supported on the output shaft of a lineal motor or actuator My mounted on the platform 62 of the winding manipulator assembly. The flexible conduit 73 is a multiduct extrusion of flexible plastic and has a plurality of spacers 73S such as washers secured in each duct thereof to retain the threads centered within their respective ducts as the conduit deflects with the up and down movement of the platform during the winding operation. A gear motor MF secured to the fixture 74 has its output shaft MFS containing a plurality of rollers 75 which cooperate with respective freewheeling pinch rollers 76 mounted on a shaft supported by the fixture for driving respective threads or filaments F fed between respective pairs of said rollers. Controlled operation of the motor MFS may thus be employed to not only feed the filaments to the surface of the shape being wound but may also be utilized to maintain the proper tension in the filaments during winding. Accordingly, suitable known means is employed to sense variations in the resistance experienced by the shaft of motor MF or the tension of filaments F between the fixture 74 and the work and to provide a feedback signal for correcting the operation of gear motor MF to provide the filaments in a predetermined state of tension as they are fed to the work.

Figure 9:
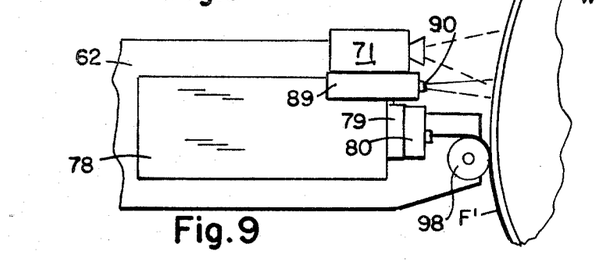
FIG. 9 is a plan view of a modified form of the apparatus of FIG. 8.

FIGS. 8 and 9 illustrate a modified form of winding means of the type described whereby filaments or ribbon material is produced on a continuous basis either directly on the described manipulator platforms or an auxiliary support means supporting or movable with the platforms; thereby eliminating the need to provide spools of filaments and to change same during the construction of the vessel or tank. Secured to the platform 62 is an apparatus 77 for continuously forming and feeding a plurality of filaments or ribbonlike formations of glass, plastic, metal or ceramic materials. The apparatus 77 includes an extrusion machine 78 of conventional design having a multiple orifice die 79 through which a plurality of filaments F of the extrusion material may be formed to shape in die 79 and fed in parallel or other array to a chilling or setting chamber 80 at the end of die 79 and operative to set or condition said filaments so that they may be parallelly fed as shown to the work W without support. Chamber 80 may comprise a water bath or water spray chamber or means for feeding a coolant gas to cool the extruding formations. The extruder 78 and chamber 80 may be movable together on the platform 62 to engage the ends of the extrusions with the work W when they are first formed. Shown in the drawings is a clamping head 81 which is provided on the shaft 84' of a lineal actuator 84 which is operative to advance a clamping fixture 81 after a solenoid 85 actuates the jaws of the fixture to grip the multiple extruding filaments as they first extrude from the die as shown in FIG. 9. Predetermined controlled operation of the actuator or motor 84 is operative to urge the filaments against the surface of the work, compress and hold same against said work surface prior to initiating the winding operation so as to secure said filaments to said work in the adhesive plastic applied thereto from the spray nozzles. The clamping head 81 may also contain heating elements or radiation curing means for the plastic in the immediate vicinity of the filament end portions so held against the work to effect the setting or curing of said plastic to hold the filaments in place so that winding may properly proceed thereafter.

Further details of the apparatus 77 of FIGS. 8 and 9 include the provision of a supply system to maintain continuous flow of extrusion material to the extruder 78 in the form of a supply or feed reservoir 79 disposed above the inlet to the extrusion screw or accumulator to which is continuously operated or intermittently feeds powdered or granular extrusion material received from a flexible conduit or conveyor 86 extending from a larger reservoir 87 of extrusion material mounted on a carriage 88 which may or may not be attached to the manipulation apparatus as described. Also provided as part of the apparatus of FIGS. 8 and 9 is a spray head 89 containing a plurality of nozzles 90 and means for spray feeding an encapsulating or bonding resin to the work in advance of or against the filaments being wound thereon as heretofore described. Curing or setting of said resin is accelerated by radiation from a radiant energy generating means 71 mounted adjacent the extrusion apparatus.

The apparatus of FIGS. 8 and 9 may be operated in a number of manners to properly provide extruded material on a preform or support for building up a container or housing thereof. Extrusion materials may comprise one or a plurality of such materials as glass, polymers, ceramics or metals which may be extruded in filamentary, ribbon, sheet, slab or other structural form to the preform or supporting structure as one or a plurality of such shapes as either the extruder and/or the preform is moved in a rotary or other manner to effect the layup or deposition of the extruded shape or shapes on the preform and, in certain winding operations, on previously extruded and wound or deposited layers.

Certain finishing operations may also be performed on the continuously extruded formations or filamentary material prior to actually applying same to the surface of the work. For example, a plurality of filaments may be extruded or blown to shape by operation of the apparatus 78 and may be spun, twisted or otherwise processed in the housing 80 before being drawn on the work to improve their tensile strength. Extruded or blown glass or ceramic filaments may be coated with a resin for bonding purposes in the housing 80 which resin may supplement or replace the described sprayed on resin. The extruder 78 maybe replaced by an apparatus for containously forming whisker elements for blow forming filaments of glass or ceramic materials in a flame jet, which filaments or whiskers may be fed directly to the work or first processed into thread before being deposited or wound thereon.

In another form of the invention, one or more sheet or structural extrusions may be continuously formed as described and spirally or otherwise fed to a support or preform for covering and forming a wall or shell thereon. Extrusion material in sheet or slab form may be downwardly extruded and draped or laid onto a suitable surface such as the ground, or a preform, from a moving manipulator or vehicle to provide a surfacing or tarmac. Sheet plastic material may be continuously extruded and downwardly fed to a support such as a floor, wall, wirelike matrix or other shape and solidified in situ thereon as the extruder or die is predeterminately moved across the surface of the support by manipulation means such as a vehicle or such as that described therein to form a covering or coating of said plastic thereon.

Figure 10:
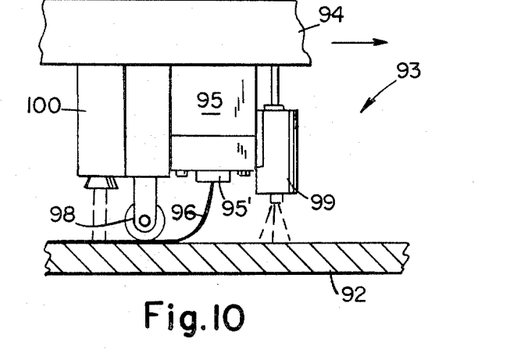
FIG. 10 is a side view of a portion of an apparatus for continuously forming a layup material in filament or sheet form and disposing same against a substrate as the forming means is conveyed past the substrate.

In FIG. 10 is shown an apparatus 93 for forming and applying an extrusion to a substrate 92 such as a preform, wall, flooring or the ground to provide a covering or coating thereon. The extrusion 96 which flows downwardly from the die 95' of an extruder 95 is shown as a sheetlike formation, although it may comprise filaments, ribbons, structural shapes or one or more slablike formations. The extruder 95 is mounted on a support 94 such as a portion of the body of a wheeled, ground- traveling vehicle or an arm of a manipulator or overhead traveling crane which is adapted to travel across the substrate 92 at substantially the speed of extrusion so as not to stretch or cause the extrusion to ruffle. Conversely, the substrate may also be moved or rotated at the same speed at which the extrusion travels from the extruder. In order to assure an even lay of the extrusion 96 against the surface of the substrate 92 and, in certain instances, to cause the extrusion to conform to said surface and become bonded thereto, a roller 98 is rotationally supported on a mount 97 secured to the end of support 94 and is operative to receive and compress the extrusion 96 against the substrate 92. The roller 98 may be power rotated to provide its surface traveling at the speed of extrusion and relative travel of the assembly 93 and substrate 92 or may be free wheeling and is operative by suitable urging said apparatus 93 toward said substrate, to predeterminately force the sheet 96 against the surface of 92 for shaping and pressure bonding the semimolten extrusion to said substrate. Notation 99 refers to a spray head for applying reinforcements and/or adhesive material when needed to the surface of substrate 92 in advance of the extrusion. Notation 100 refers to a curing apparatus such as a radiant energy generator or coolant dispenser supported beyond roller 98 on mount 94 and operative, when necessary, to accelerate curing or hardening of the plastic material extruded onto the preform or substrate.

The apparatus 93 of FIG. 10 may be utilized to extrude, lay, bond and cure thermoplastic or thermosetting resins or metal in sheet, slab, strip, tubular, structural or otherwise shaped formations to such substrates as skeletal supporting structures such as welded rods, wire mesh or honeycomb structures; inflatable preforms and other surfaces which offer sufficient support during the layup, winding or coating operation. In one procedure, a sheet, strip, tube or structural extrusion may be formed and compressed against a substrate or a previously extruded portion of the same material which may be supported facewise or edgewise. The operation may include butt or lap welding or bonding the extrusion to previously extruded portions thereof in the act of constructing a large wall, tarmac, dome, hull or other shape with a portion of the wheel or roller 98 operative to effect said butt or lap welding of the extrusion.

In such an operation, the spray means 99 may or may not be utilized to spray or extrude adhesive of filamentary material between or along the edges of the extrusion being deposited and that deposited by previous layup operation of the apparatus. For example, the manipulation means for the apparatus 93 may be operative to extrude one or more strip, sheet, tubular or structural shapes in a circular movement to form large cylindrical shapes or in a spirallike movement about a vertical axis to form domelike or conical shapes.

Figures 11, 12, 13, 14:
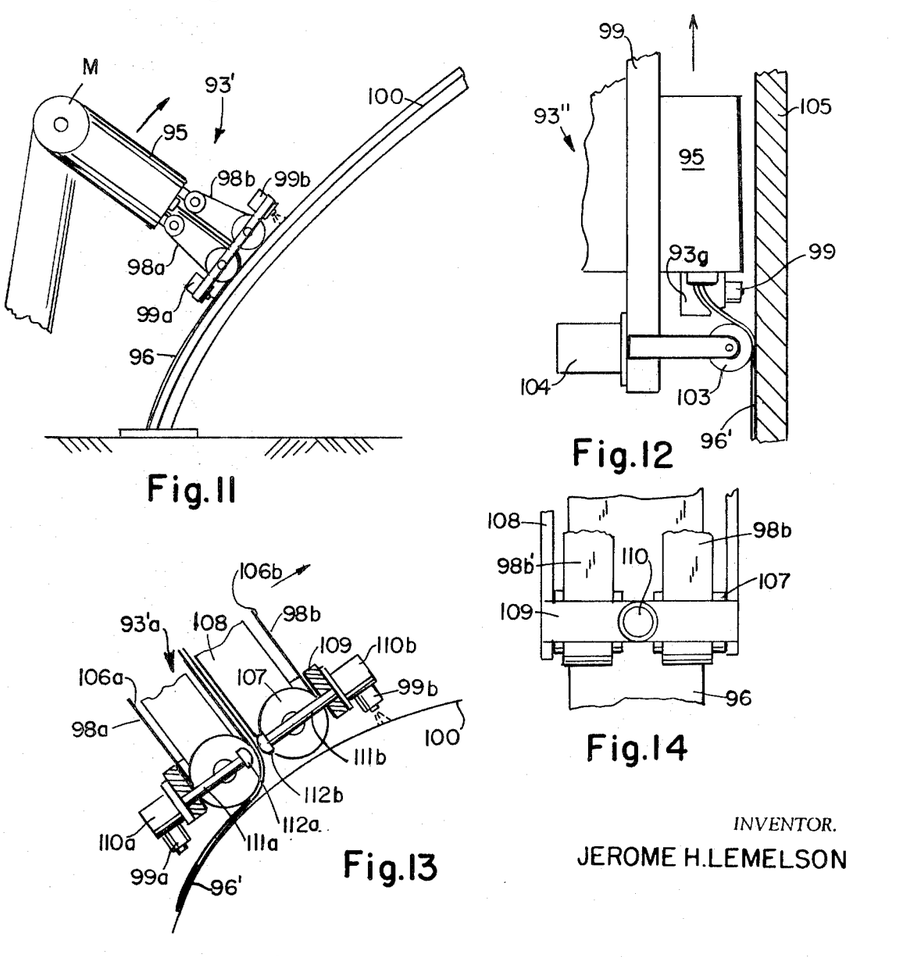
FIG. 11 is a side view of a layup apparatus employing a manipulator and means for continuously forming layup material such as a sheet of plastic or ceramic.
FIG. 12 is a side view of a layup or coating apparatus operative to travel up a frame or wall supporting the surface to be coated or covered.
FIG. 13 is a partial side view with parts broken away and omitted for clarity of a portion of a modified form of the apparatus shown in FIG. 11.
FIG. 14 is an end view with parts broken away for clarity of the apparatus of FIG. 13.

In FIG. 11, an apparatus 93' of the type provided in FIG. 10 is operative to move bidirectionally to extrude material of the type described as a series of separate extrusions formed edgewise, overlapping or one on the other above a support such as a floor, frame or ceiling to define a roof, covering or coating thereon. In other words, the extrusion material is first operative to be deposited while the apparatus travels in a first direction and at the end of travel in said first direction, extrusion is terminated and the layup apparatus shifted laterally a predetermined degree above the substrate and extrusion is again initiated while said apparatus moves parallel to the previous path of travel so as to lay or compress extrusion against the next lateral portion of the base against which the material is being deposited. Termination and reinitiation of extrusion may be effected by controlled operation of the motor driving the extruder prime mover and/or by controlling a motor or solenoid effecting movement of a tapered mandrel or externally mounted gate as provided in my copending application, Ser. No. 142,405. The apparatus 93 of FIG. 10 may be utilized to perform the above-described operations by mounting the base 94 on a manipulator M which is adapted to rotate same 180° at the end of each travel across the surface to be covered or coated so as to position the roller 98 behind the extrusion die to properly receive and compress the extrusion 96 against the substrate. In FIG. 11 power driven belt conveyors 98a and 98b are provided on both sides of the extrusion die opening. The conveyor 98a receives and compresses the extrusion against the substrate or frame 100 during movement of the apparatus 93' to the right while roller 98b receives and compresses the extrusion against the base or frame 100 during movement to the left. A pair of nozzles 99a and 99b are disposed on opposite sides of the extrusion orifice to respectively deposit adhesive or reinforcing material onto the substrate in advance of the extrusion for the purposes described depending on the direction of travel of the manipulation apparatus M.

In FIG. 12 is shown a modified form of the apparatus of FIGS. 10 and 11 adapted for downwardly extruding a sheet, strip, slab or structural shape 96' to define a support or portion of a vertical wall as provided, for example, in the construction of a building or other form of housing. The apparatus of FIG. 12 is somewhat like that shown in FIG. 11 with the exception that the support for the downwardly extruded sheet or slab of material comprises a framework of beams or other structural members including one or more vertical members 105 against which is extruded and compressed the downwardly extruded material. The beam 105 illustrated in FIG. 12 may comprise a corner beam or one of a plurality of vertical beams of a boxlike skeletal framework and may, in one form, define a trackway for guiding and/or supporting the extrusion equipment 93''. In one form, said extrusion equipment may be movable up and down on a mast 99 which is supported by the building framework which includes the vertical beam member 105 as well as the ground or floor adjacent to said frame. In another form, the frame containing vertical beam 105 may also define a trackway for guiding and supporting the extrusion equipment.

The apparatus 93'' for laying an extruded sheet or slab of plastic, mortar, Portland cement or other material includes an extruder 95 operative to downwardly extrude, sheet, slab or structural material 96' which is guided against a roller 103 supported by the extruder 95 or its mount, the roller being positioned to guide the extrusion against the member 105 and any members adjacent thereto and, in one form, to compress said extrusion thereagainst in a manner to effect its attachment of bonding thereto. If the member 105 is a channel, the roller or rollers 103 may be operative to compress portions of the extrusion 96' into the recess in said channel to effect its fastening thereto. Adhesive means may also be disposed against the surface of member or members 105 by one or more spray or flow heads 99 mounted on the extruder or by first disposing same against the surface of the extrusion 96' facing member 105. Fasteners or other members applied by means (not shown) supported by the apparatus 93'' or auxiliary means may also be used to secure the downwardly extruding sheet or slab extrusion 96' to the frame or base 105.

FIGS. 13 and 14 show further details of an apparatus of the type shown in FIG. 11 for guiding an extrusion such as a sheet extrusion or a plurality of extrusions such as a plurality of extruded strips from a manipulated extrusion chamber to a surface of an article or preform 100.

The apparatus 93' a includes, in addition to the described extrusion means and manipulating means therefore which is not illustrated in FIGS. 13 and 14, a plurality of conveying belts at least two or more pairs of which are driven close to each other to cooperate in guiding the extrusion 96 immediately after it passes from the extruder into engagement with the surface of the structure of member 100. At least two pairs or power driven, endless belts are shown which are driven about respective drums 107 supported by a frame 108. In the plan view, FIG. 14, two upper belts 98b and 98b' are spaced laterally apart from each other and a lineal actuator or solenoid 110 is supported by a cross member 109 and is adapted to project and retract its shaft 111b between the two belts to engage the upper surface of the extrusion 96 and to force it against the belts 98a beneath the upper belts to as to make the extrusion conform to the lower belts and to be driven between the lower belts and the work as illustrated in FIG. 13 when the manipulation apparatus 93'a is moving in the direction of the arrow shown in FIG. 13. Thus the solenoid or actuator 110b is operated when the extrusion first passes in alignment with the end rolls or drums 107 and the manipulator is to lay the extrusion on the surface of member 100 in moving upwardly in the direction of the arrow. When the manipulator is to move downwardly and counterclockwise, the shaft 111b of actuator 110b is retracted and the shaft 111a of a second actuator 110a mounted beneath the conveyor belts 98a is projected to force the extrusion as it passes the rolls against the upper belts 98b and 98b' so as to cause the extrusion to be compressed between said upper belts as they are driven around their end drums 107 and the work. Accordingly, utilizing the apparatus of FIGS. 13 and 14, the layup or coating procedure may be effected by initiating extrusion, guiding the extruded material between the belts and causing it to conform to the proper to as it is driven over its end drum so that the extrusion will be compressed against the surface of the work and will be continuously disposed thereon as the manipulator moves in the proper direction. When it is desired to reverse direction of the manipulator after it is shifted laterally a sufficient degree to lay the next extrusion material at a proper lateral distance from that just laid after the previous layup run has been terminated, extrusion is again initiated and the proper actuator 110 is projected while the opposite actuator is retracted to cause the extrusion to conform to the proper belt for delivering the extrusion to the surface of the substrate as the manipulator travels substantially at the speed of extrusion in the proper direction.

In FIG. 13, notations 99a and 99b refer to respective dispensing heads disposed at the upper and the lower ends of frame 108, each or both of which may be predeterminately operated to perform one or more of such functions as spraying an adhesive against the surface of the substrate to receive the extrusion material just prior to the disposing of said extrusion material thereon, flame treating or heating the surface of the substrate to facilitate adhesion or welding of the extrusion material thereon, spraying or otherwise dispensing a reinforcing material such as filaments, chips, or other preformed material including, in certain instances, adhesive or binder material therefore, against the surface of the substrate and/or the extrusion immediately after it is applied to the substrate, flame treating or heating the extrusion as or immediately after it is disposed against the surface of the substrate to permit its further processing or otherwise affecting the surface of the substrate and/or the extrusion. As stated, the devices 99a and 99b may be simultaneously or alternately operated to dispense material, direct radiant energy against the extrusion and/or substrate, dispense cooling material against the extrusion or otherwise process same.

It is noted that the apparatus shown in FIGS. 1 and 3 may be further modified to include manipulation means such as trackways similar to the trackway 14 both inside and outside of the preform 20', the inside trackway supporting apparatus such as spray or deposition means which is operative to move vertically thereon as the arm 13 rotates and finish or deposit material on the inside surface of the preform thereby eliminating the need to effect such operation by hand or other means and accomplishing same at the same time the outer portion of the wall of the tank 20 is formed as described.

If the preform 20' is shaped other than cylindrically, suitable motor operated means may be mounted on the vertically travelling carriages 17 and 35 of FIGS. 1 and 3 to permit proper horizontal displacement of the heads 18 with respect to the surface location of the preform means to account for variations thereof as the location of the preform surface varies with respect to the vertical. All of the described motor operated devices may have their motors predeterminately controlled by respective speed control means or by a single master controller to predeterminately control layup or winding operations. Record signal playback means or other suitable numerical or analog signal control means may be employed to effect a complete manufacturing cycle as described to produce large, hollow, tanklike structures.

FIG. 15 illustrates an automatic control diagram showing means for automatically controlling apparatus of the type described. While the control components and subsystem of FIG. 15 is particularly applicable to the apparatus shown in FIG. 2, modifications may be made thereto, particularly with respect to the servo motors employed for manipulating the layup head so as to provide a similar control system for controlling the layup apparatus shown in the other Figures of the drawing.

The apparatus 198 includes an automatic program controller 199 capable of generating a plurality of coded digital and/or analog control signals on different outputs 199' thereof for controlling the different motors involved in the operation of the layup or winding apparatus shown in FIG. 2. The motors MR, MJ1, MJ2, MJ3 and MJ4 are each operated and predeterminately controlled in response to digital pulse signals generated by the computer or command control generator 199. Each of said motors is provided with a control unit having the general numerical notation 200 followed by the alphabetical notation relating to the particular motor. Details of each control unit 200 are shown in the dashed-out line box 200JL which relates to the controller for the motor MJ1. The controller 200 receives on its input signals generated by the master controller 199 such as a series of binary digital pulse codes which are generated in reading punched card or, more preferably, a particular track of a multitrack magnetic tape defining the recording medium of a magnetic recorder forming part of the signal generator or computer 199. Binary code pulse output of generator 199 extends to a series-to-parallel diode converter 201 located in the controller 200 where each code command is converted to a parallel code which code is transmitted to a relay storage bank 202 containing precision resistor elements. The resistance setup in the relay storage unit 202 is proportional to the digital information transmitted to the controller 200 as reproduced from the recording medium or tape therein. Thus, the relay storage unit 202 introduces a resistance proportional to the numerical value of the original command control signal transmitted thereto into a self-balancing bridge part of a comparator device 200C. A feedback signal is generated during operation of the servo motor MJ1 which controls rotation of the manipulator arm 24 about the joint J1 by a response potentiometer 207 which is coupled to the shaft of the output of motor MJ1 and provides an error signal to said comparator 200C which is used to control the operation of said motor in moving the entire assembly comprising arms 24, 25 and 26 as well as the deposition or layup head 18 in a vertical direction. If it is desired to maintain a particular vertical attitude of the arm 24 relative to the joint J1 during the operation of one or more of the other servo motors in predeterminately manipulating their respective assemblies, then said error signal diminishes to zero when the bridge in the comparator unit balances, resulting in a null condition in the comparator where the motor MJ1 will stop. For those operations involving constantly moving the layup head 18 to effect a spirallike or helical winding or layup of the filaments against the preform, the signal generated on the input to motor MJ1 will be of such a nature as to slowly operate said motor to lower or raise the assembly supported thereby at a rate sufficient to effect the proper vertical movement of the layup head 18 during the winding operation.

The automatic controllers 200MR, 200J2, 200J3 and 200J4 of the described motors MR, MJ2, MJ3 and MJ4 are similar in operation to the controller 200–J1 described and each receive digital command codes generated by the command signal generator 199 for properly operating the entire manipulator to properly move the layup head 18 in rotation, vertically and, in certain instances which will depend upon the shape of the preform, in a horizontal direction relative thereto.

A second automatic controller 203 is illustrated as operative to control the means for feeding and, in those instances where applicable, extruding filaments or other layup material against the preform in the manners described. The controlled motor me is a hydraulic-operated motor which is directly controlled in its operation by a variable displacement pump 206 forming part of a control subsystem defined by the notation 203. The control subsystem 203 includes an electric stroker 204 connected to operate a hydraulic stroker 205 which, when varied by said electric stroker variably operates the variable displacement hydraulic pump 206 for providing controller operation of the motor ME. A closed loop speed control system is provided in which the output speed motor ME is measured by a feedback tachometer 208 which, is driven by the output shaft of the motor ME. The output of the feedback tachometer 208 is bucked against a reference signal generated, for example, by reproducing an electrical signal of predetermined characteristics on the output of the command signal generator and feeding same to a comparator device 203'' such as a voltage comparator or summing amplifier having its inputs connected directly to the feedback tachometer 208 and an output of the signal generator 199. The electric stroker 204 thus controls the operation of the hydraulic stroker 205 which in turn controls the displacement of the variable displacement pump 206 which directly controls the motor ME operating the screw or piston of the extruder or means of supplying filaments or layup material to the layup ahead.

Comparator units similar to the unit 203 provided to control the motor ME are also provided in FIG. 15 to control a pump motor MP operative to control a pump 70P for dispensing liquid plastic or layup material from the described nozzle 70. A third automatic controller 203 is shown operatively connected to control a motor MF which operates the feed roller 75 for feeding the layup material or filaments to the surface of the preform as described in FIG. 7.

Also shown in FIG. 15 is the radiant energy-generating device 71 utilized to effect a fast cure of the resin deposited against the surface of the preform through the nozzle or bank of nozzles defined by notation 70. The device 71 may comprise an electron gun or other source of suitable radiation which is switched on and off or varied in intensity in accordance with signals generated and transmitted thereto from the command signal generator 199 according to the particular requirements of the particular layup or winding operation.

In the event that a filament-winding apparatus of the type shown in FIGS. 5 and 7 which feeds a plurality of filaments from respective prewound spools is employed, then the control system of FIG. 15 would not include an extrusion head and the illustrated means for controlling such a head.

FIG. 16 illustrates an automatic filament-winding system employing direct digital control of servo motors and devices of the type described. A command signal generator 210 such as a multicircuit timer, card or tape reader generates signals on a plurality of outputs 211 thereof which signals are transmitted to directly control the operation of such devices as those shown in FIGS. 8 and 9, for example, including the motor MT for driving the carriage 88 around its circular trackway, the motor MZ for driving the filament-winding apparatus up and down the column 60, the motor MY for advancing the filament-winding head towards and retracting same away from the surface of the work for the purposes described, the motors 84 and 85 for clampingly engaging and advancing the filaments fed from the extruder or coil supply thereof against the surface of the preform 20', the motor MR-E for rotating the drum 98 which engages the filaments against the surface of the work during the winding or layup operation and, one or more motors utilized to operate one or more pumps for dispensing one or more liquid layup materials such as different resins or a resin and a catalyst therefore, said pump motors being designated MP1 and MP2 which are respectively connected to operate pumps P1 and P2 both of which are shown feeding the dispensing nozzle or nozzles 89. A further output of the command control unit 210 is shown connected to operate the radiant energy device 71 described.

Also shown in FIG. 16 is a pressure switch 212 supported so as to engage the surface of the preform 20' when the layup material or filaments FR are compressively engaged against said preform surface by the clamping device 81. The switch 212 is operatively connected to the stop control S of lineal actuator motor 84 to stop the forward motion of the clamping device 81 when the filaments are properly engaged thereby against the preform surface. Controls F and R of the actuator 84 respectively initiate forward movement of the clamping device and reverse movement while a single control input to the clamping fixture motor 85 is used to cause the clamping fixture 81 to engage the filaments when said input is energized by a signal generated by the control unit 210. Controls U and D for the motor MZ are respectively utilized to effect upward drive and downward drive of the motor MZ in accordance with the requirements of a winding or layup cycle.

The pumps P1 and P2 may be respectively operated either simultaneously or in sequence to deliver different layup materials against the preform in accordance with predetermined manufacturing requirements or may each be predeterminately controlled to deliver both a resin and its catalyst such as polyester resin and the catalyst therefore, to the surface of the preform in accordance with predetermined requirements.

By utilizing variable control means of the types provided in FIGS. 15 and 16, a highly flexible and variable layup apparatus is provided which may be used to form a variety of different structures by a number of different techniques employed per se, in sequence or simultaneously. For example, an apparatus of the type described employing filament winding and spray means which are predeterminately controllable, may be utilized to form large hollow bodies of revolution by filament winding, combined with a spraying operation to provide a predetermined amount of binding material for the wound filaments. The same apparatus may also be utilized to form a large hollow body of revolution by spraying a layup material such as a suitable resin per se or one which foams in situ immediately after it is expelled from the spray or dispensing head. Large bodies of revolution may be formed of composite materials including a preform on which is disposed a first resin such as a foamed-in-place plastic on the top of which is disposed a second resin and filaments by means such as provided in FIG. 16. Or, conversely, a filament-wound or reinforced material may be disposed on a preform over which said material a second material such as a self-foamed resin or other suitable material may be disposed by the same layup apparatus for protecting or insulating the base material.

In still another form of the invention, an extruder provided on a deposition head may be operative to form a preform by extruding a sheet material or plurality of filaments against a plurality of uprights, after which further extruded material or filaments and resin are disposed or deposited against the base material.

By providing means as described for predeterminately controlling the speed of operation of the manipulator servo motors, the filament-winding material or extrusion material and the sprayed-on deposition material, as well as the other variables described, process variations may be derived which will optimize both the shape of the body being formed and the amount of time required to form and cure same.

It is noted that while the electrical circuitry in FIGS. 15 and 16 is shown in block notation in order to simplify the diagrams, it is assumed that suitable electrical power means is provided on the correct sides of all switches, motors, solenoids and controls for properly operating same predeterminately as determined by the operation of the program controllers 199 and 210. Adaptive control means including means for detecting tension in the filaments F or the physical characteristics of the extrusion applied to the substrate as or before it is disposed thereagainst, may also be utilized to provide feedback signals for correcting or optimizing such extrusion variables as the speed of operation of the extrusion screw, temperature of the extrudate or melt as or before it is extruded and/or operation of the driven and compression rolls 75 and 98. In connection with the operation and disposition of the program controllers 199 and 210 it is noted that they may be suitably supported on the described manipulation apparatus for the layup heads such as on the manipulator arms, frames, carriages or bases and operatively connected to the controls for the various servomotors by wires, brushes and slip rings or by short wave means to effect control.

The program controlled means shown in FIG. 16 for selectively delivering a plurality of different materials to the single injection nozzle 89 may also be modified and utilized to deliver two or more of a plurality of extrusion materials either simultaneously at respective predetermined rates of flow to the extruder 78 or in sequence. The quantity and timing of the flow of each extrusion material to the extrusion die being predetermined controlled by different signals generated by the command signal generator 210 on respective outputs connected to control respective extrusion material feed motors operating respective extrusion screws or other means for feeding respective materials to the extrusion chamber. Thus the extrusion F may be composed of predetermined quantities of different extrusion materials such as a core of one material and a coating of a different material or an extrusion which varies in composition along its length in accordance with predetermined requirements. Extrusions which vary in color along their length may also be similarly produced for color coding or decorative purposes. For example, by program controlling the flow of different colored resins to the extrusion die, the filaments P may be variably colored so as to produce different decorative patterns on the surface of the preform or other suitable substrate against which the filaments F are extruded.

A modified form of the apparatus of FIG. 16 employing two or more feed screws or pumps to provide different extrusion materials to a single extrusion die under the control of an automatic controller or program control means of the type described may also be provided to form one or more extrusions of materials which vary in density or flexibility. For example, an extrusion may be formed having discrete portions of its length formed of a low-density polymer such as low-density polyethylene which low density or flexible portions are interposed between other portions of the extrusion which are made of higher density or more rigid resin such as a high density polyethylene. The low density or flexible portions may be easily bent, compressed or otherwise deformed while the high density portions provide greater support and may remain undeformed during use. Filaments, sheets, strips or other shapes may be utilized as layup or reinforcing material requiring portions thereof to be flexible for hinge, bending or expansion purposes. Tubular shapes having major sections made of rigid plastic such as rigid vinyl or linear polyethylene having short portions of its length made of more flexible polymers interposed between said more rigid portions may be bent of flexed at said flexible portions. Each of the rigid and flexible polymers may be fed from a respective pump or extrusion screw feeding a single extrusion chamber or die, the pumps or screws being respectively controlled by a single multicircuit timer such as 210 employing direct signal generation to start and stop the motors thereof or to feed a controller, such as subsystem 203 of FIG. 15 for each of the extrusion or pump motors. Thus by varying the programming or signals recorded in the extrusion program controller extrusions may be produced which not only vary in density along their lengths but which also vary in density across any particular cross section thereof. Such apparatus may be used for layup or construction means as described or for producing extrusion which vary in composition along their length.

In connection with the hereinabove suggested hardening of a filler material between the bottom of the housing 48 and the upper surface of the tarmac T of FIG. 4, it is noted that suitable retaining means for said filler material may be provided by securing planking or stripping around the preform against the upper surface of the tarmac T in the vicinity of the periphery of the housing 48. It is also noted that a hood may be provided surrounding the layup head 18 of the apparatus of FIGS. 1-3 to prevent dust and dirt from contaminating the layup material before it sets.

I claim:

1. Apparatus for forming walled structures such as housings, vessels and the like comprising:
   a. extrusion means including a head having a die for defining the shape of an extrusion and for continuously expressing hardenable material from said die in a shape adapted to form at least part of the wall of the structure,
   b. manipulation means for said extrusion means,
   c. support means including a preform for receiving the extrusion after it leaves said die for fixedly supporting said extrusion in space,
   d. means for controlling the operation of said manipulation means to cause said head to be conveyed in a predetermined path with respect to said preform to guide the extrusion expressing from said die and to dispose it against said preform so as 50 form a wall-like covering on said preform and
   e. means for securing said extrusion to said preform as it is disposed thereon to form an integral assembly therewith.

2. Apparatus in accordance with claim 1, said die comprising a sheeting die operative to form said hardenable material into a sheet which is layed on and covers said preform.

3. Apparatus in accordance with claim 1, said die being shaped to form an oblong structural member, said manipulation means being operative to lay said oblong member against said preform, and a means for securing said oblong member to said preform as it exits from said die.

4. Apparatus in accordance with claim 1, said die being shaped to form a plurality of oblong structural members thereof, said manipulation means being operative to lay said plurality of oblong structural members onto said preform.

5. Apparatus in accordance with claim 1, said extrusion means including means for extruding and feeding a plurality of winding filaments from said head and means for controlling rotation of said preform means to permit said filaments to be wound thereon.

6. Apparatus for forming large hollow bodies comprising:
   a. a preform having a wall against the outer surface of which layup material may be deposited,
   b. a track fixedly supported around said preform at the lower end thereof,
   c. a carriage operative to travel said track,
   d. a guideway supported at its lower end by said carriage, and extending upwardly therefrom adjacent said preform,
   e. layup means for material to be disposed against the outer surface of said preform including a working head and means for dispensing material therefrom,
   f. means for movably supporting and moving said head along said upwardly extending guideway,
   g. first power operated means for driving said head in both directions on said guideway,
   h. an upstanding support supported and extending beyond the upper end of said preform and inwardly of the wall of the preform,
   i. said upstanding support being connected to the upper end of said vertical guideway for supporting said guideway from above,
   j. second power operated means for driving said carriage around said track to convey said working head around and adjacent to said preform,
   k. means for feeding material to be deposited to said working head and control means for said material feeding means, and
   l. master control means for controlling operation of said first and second power means and said means for feeding material to said working head in a preprogrammed cycle to cause the head to predeterminately travel said vertical guideway and to be predeterminately conveyed around said preform and to control flow of layup material therefrom so as to predeterminately dispose said layup material against said preform.

7. Apparatus for forming large hollow bodies comprising:
   a. a preform having a wall against the surface of which layup material may be placed and solidified in situ thereon,
   b. a manipulator including an upstanding support supported interior of said preform,
   c. a first arm pivotally supported by said upstanding support, and
   d. a layup fixture supported at the end of said first arm,
   e. a working head supported by said layup fixture beyond the outer surface of said preform,
   f. means for operating said layup fixture to move said working head vertically a distance away from the outer surface of the preform,
   g. means for feeding material to be deposited on said preform to said working head, and control means for said material feeding means,
   h. first means for rotating said first arm about said upstanding support to convey said layup fixture around said preform, first control means for said rotating means,
   i. second control means for said means moving said working head vertically and
   j. master control means for controlling the operation of said first and second control means and said control means for said means for feeding material to said working head in a preprogrammed cycle whereby said working head is predeterminately conveyed about said preform and said material is predeterminately dispensed therefrom onto said preform.

8. An apparatus in accordance with claim 7, wherein said layup fixture includes a second arm pivotally supported at the end of the first arm, a third arm pivotally supported at the end of said second arm ands supporting said working head, and means controlled by said master control means for power rotating said second arm on said first arm and said third arm on said second arm to permit predetermined positioning of said working head with respect to the surface of said preform at different height locations thereof.

9. Apparatus for forming large hollow bodies comprising:
   a. a preform defining a surface of revolution,
   b. means for supporting said preform in a substantially vertical attitude,
   c. a circular track fixedly supported at the lower end of said preform, d. a carriage operative to travel said track,
e. a vertical guideway supported by said carriage and operative to travel around said preform as the carriage travels said track in a path whereby said vertical guideway is guided at substantially a constant distance away from the surface of revolution of said preform,
f. layup means for material to be disposed against the outer surface of said preform including a working head and means for dispensing material therefrom,
g. means for movably supporting and moving said head along said vertical guideway,
h. first power operated means for driving said head in both directions on said vertical guideway,
i. second power operated means for driving said carriage around said track to convey said working head around and adjacent to the working surface of said preform,
j. means for feeding material to be deposited to said working head, and
k. control means for controlling operation on said first and second power means and said means feeding material to said working head to cause the head to predeterminately travel said vertical guideway and to be conveyed around said preform so as to predeterminately dispose material against said preform.

10. An apparatus for forming hollow bodies by predeterminately disposing material onto a preform comprising:
layup means including a working head,
means for supporting said preform adjacent said working head and
means for relatively moving said head and said preform to cause the head to predeterminately scan the surface of said preform,
means for controllably feeding radiation curable material to said working head, and feeding said material from said head to said preform as the head scans the surface of the preform, and a source of radiation disposed adjacent to said working head and operative to direct radiation against said radiation curable material as it is disposed against said preform so as to cure same in situ on said preform.

11. An apparatus in accordance with claim 10 including means for feeding filamentary material to and from said head against said preform together with said radiation curable material so as to bind said filamentary material in the radiation cured material.